(12) United States Patent  (10) Patent No.: US 8,155,990 B2
Chickering et al.  (45) Date of Patent: Apr. 10, 2012

(54) LINEAR-PROGRAM FORMULATION FOR OPTIMIZING INVENTORY ALLOCATION

(75) Inventors: David Max Chickering, Redmond, WA (US); Manan Sanghi, Bellevue, WA (US); Ashis Roy, Redmond, WA (US); Robert Paul Gorman, Woodinville, WA (US); Izzet Can Envarli, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 12/359,932

(22) Filed: Jan. 26, 2009

(65) Prior Publication Data

US 2010/0191558 A1  Jul. 29, 2010

(51) Int. Cl.
*G06F 17/50* (2006.01)
*G06F 9/44* (2006.01)

(52) U.S. Cl. .................... 705/7.12; 705/14.4; 705/28

(58) Field of Classification Search .................... None
See application file for complete search history.

(56) References Cited

U.S. PATENT DOCUMENTS

| | | | |
|---|---|---|---|
| 2005/0086110 A1* | 4/2005 | Haley et al. | 705/14 |
| 2009/0089151 A1* | 4/2009 | Protheroe et al. | 705/10 |
| 2010/0082428 A1* | 4/2010 | Vassilvitskii et al. | 705/14.49 |
| 2010/0185515 A1* | 7/2010 | Yerneni et al. | 705/14.58 |

OTHER PUBLICATIONS

Naoki Ade and Atsuyoshi Nakamura (Learning to optimally schedule Internet Banner Advertisements) published 1999.*
A Linear-Program Formulation for Optimizing Inventory Allocation: Manan Sanghi, Can Envarli, Paul Gorman, Ashis Roy, Max Chickering, Jun. 19, 2008, 7 pages.
A Linear-Program Formulation for Optimizing Inventory Allocation: Manan Sanghi, Can Envarli, Paul Gorman, Ashis Roy and Max Chickering, May 22, 2008, 7 pages.

* cited by examiner

*Primary Examiner* — Luna Champagne
(74) *Attorney, Agent, or Firm* — Shook Hardy & Bacon LLP

(57) ABSTRACT

Computer-readable media for determining whether to accept a candidate order from a content provider, or advertiser, to display a particular number of advertisements within a specified time segment are provided. Initially, the content provider may include placement criteria that, among other things, identify a leaf node at which impressions of the advertisement are expected to be rendered. Generally, the leaf node refers to a location within a topic graph that describes inventory that is permissible to allocate to satisfy the candidate order. To perform the determination, the inventory of impressions available for accommodating the candidate order and a log of booked orders scheduled to be placed within the time segment are identified. Linear programs are then utilized to determine whether the estimated inventory that satisfies the placement criteria is available by predictively placing the booked orders at the estimated inventory. If estimated inventory remains available, the candidate order is accepted.

17 Claims, 5 Drawing Sheets

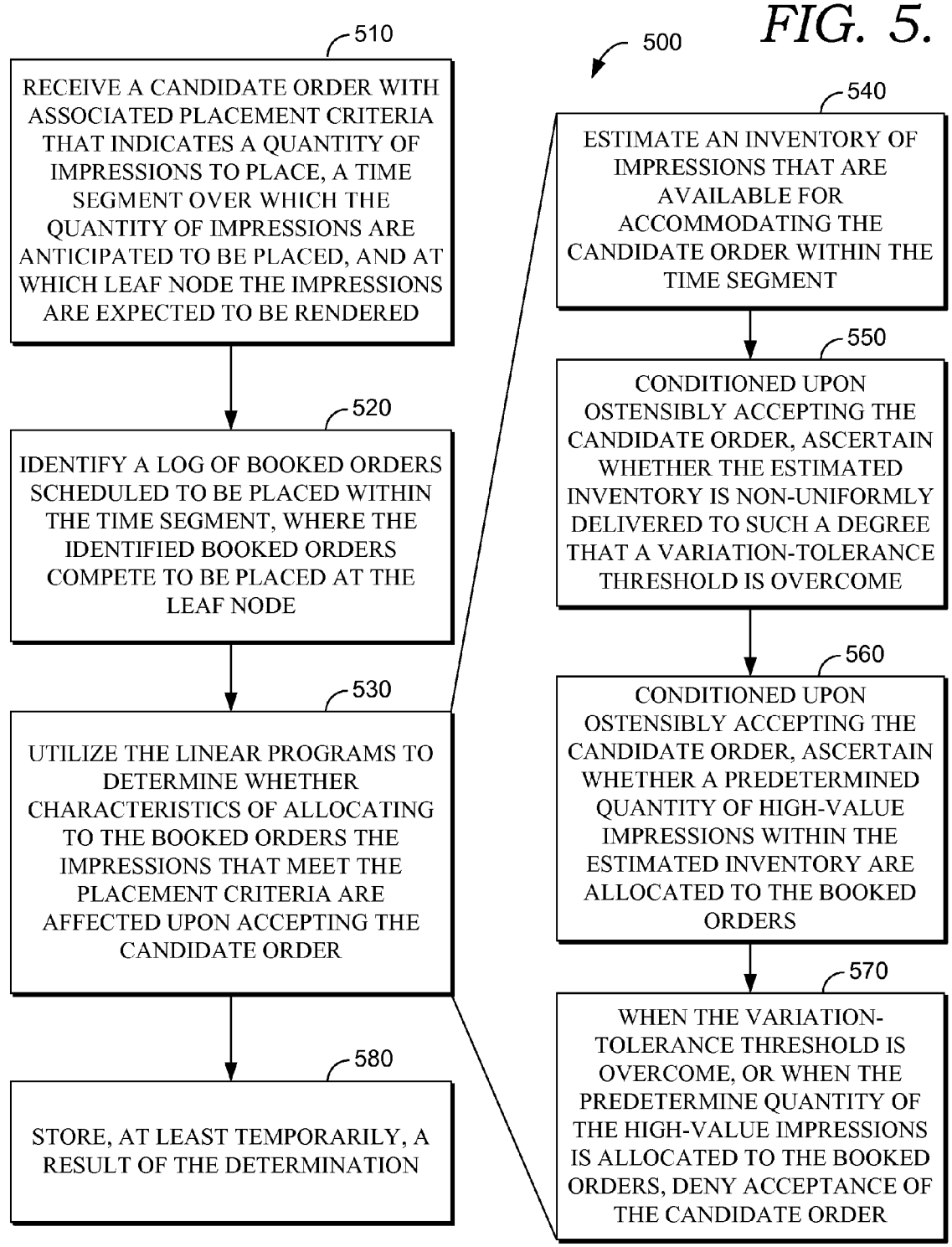

LINEAR-PROGRAM FORMULATION FOR OPTIMIZING INVENTORY ALLOCATION

CROSS-REFERENCE TO RELATED APPLICATIONS

This application is related by subject matter to U.S. Nonprovisional application Ser. No. 09/565,583, filed May 4, 2000, entitled "NOISE REDUCTION FOR A CLUSTER-BASED APPROACH FOR TARGETED ITEM DELIVERY WITH INVENTORY MANAGEMENT," which is herein incorporated by reference.

STATEMENT REGARDING FEDERALLY SPONSORED RESEARCH OR DEVELOPMENT

Not applicable.

BACKGROUND

The Internet has become increasingly popular with end users, to the extent that advertisers are recently attracted to this medium for purchasing advertising space. Accordingly, online advertising is an important piece of the marketing campaigns and sales strategies of many client businesses, advertisers, or content providers. In order to accommodate advertisers wishing to post online advertisements, web pages are often designed to offer content regions therein for sale. These content regions are configured to present advertisements to the end user upon navigating to the web pages. However, these advertisements are presented only if the advertisers place orders to purchase a particular number of display instances, or impressions. Typically, a delivery engine is responsible for accepting the orders and distributing the advertisements for presentation at the content regions of selected web pages.

Typically, when orders are placed to the delivery engine, they are guaranteed upon accepting the order. That is, the delivery engine has made a commitment to show the number of impressions as instructed in the orders. For instance, if an advertiser orders one million impressions of a particular advisement, there automatically exists an agreement that the delivery engine will cause each of the one million impressions to occur. If the delivery engine does not meet its obligation to present each of the one million impressions of the advertisement, or underdelivers, the advertisers may experience customer dissatisfaction which may result in the delivery engine losing business or being forced to offer rebates to retain their current business. This problem of fulfilling the orders accepted by the delivery engine is exaggerated in the situation where the delivery engine is servicing multitudes of advertisers that each place various orders with different time frames for presenting impressions of the advertisements being ordered.

Conventional mechanisms for ascertaining how to deliver ordered impressions of advertisements and for determining whether inventory is available for accepting new orders are labor-intensive (e.g., requiring a considerable amount of user-initiated tracking and calculations) and are not fluid, flexible, or efficient. Further, these conventional mechanisms are ad-hoc solutions that cannot dynamically react to a change in orders or inventory. As such, employing a sequence of linear programs that dynamically identify optimal allocations of the available inventory, and that facilitate deciding whether to accept a new order by evaluating currently accepted orders along with the new order against available inventory, would enhance the advertiser's experience when conducting a marketing campaign via the delivery engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and a delivery engine for employing a sequence of linear programs to determine whether to accept a candidate order, submitted by an advertiser, by taking into account booked orders competing for inventory. Generally, the booked orders are orders offered by customers of the delivery engine and previously accepted by the delivery engine. In embodiments, the delivery engine includes a processing unit coupled to a computer storage medium that stores a plurality of computer software components executable by the processing unit. Incident to execution, the computer software components perform various operations that may include one or more of the following processes: receiving the candidate order with associated placement criteria; and estimating an inventory of impressions that are available for accommodating the candidate order and meeting the placement criteria. By way of example, the placement criteria may identify a quantity of impressions of advertisement(s) to place, a time segment over which the quantity of impressions are anticipated to be placed, and at which node in some topic graph the impressions are expected to be rendered.

As described herein, and as more fully discussed with reference to FIG. 3, a node represents predefined subject matter that a content providers may specify when selecting criteria for placing their advertisements online. That is, as used herein, the term "node" relates to a location within a topic graph, where the location of the node represents a specific description of the inventory that is permissible to allocate for satisfying the candidate order. By way of example, the description of the article of inventory includes properties that expose a context of a web page, while the inventory includes one or more content regions within the web page that are reserved for presenting impressions as instructed by the delivery engine. By way of example, a node may be associated with "sports." Accordingly, the candidate order is filled by placing impressions in content regions of web pages that are in the "sports" area of some web site, or on a web page that has been identified as being sports-related.

These nodes may be arranged in a topic graph (see reference numeral 300 of FIG. 3). Generally, the topic graph is composed of a plurality of nodes that are interconnected by way of a parent-child relationship, where each of the plurality of nodes represents a description of an article of the inventory (e.g., content region on a web page) being used to fulfill the booked orders. Accordingly, nodes may be arranged in a hierarchy with various parent nodes (general descriptions of articles) connected to various child nodes (narrow descriptions of articles). A child node that is a particular description of an article, or a bottom node of the hierarchy constructed by the topic graph, is referred to herein as a "leaf node." In an exemplary embodiment, a leaf node is the most specific content description that is defined by the delivery engine.

In operation, a content provider can target a leaf node or any other nodes that are non-leaves when specifying criteria for placement. If the content provider targets a node that is a parent of leaf nodes, the delivery engine assumes the content provider does not have a preference as to which leaf node the ordered advertisements are assigned. By way of example, when a content provider orders one million impressions of an advertisement at a parent node, the order is satisfied if a million impressions are shown with the advertisement at any leaf node that is a descendant of the parent node. The process of assigning is accomplished by solving the linear programs discussed below and typically involves making predictions about available volume, etc, with respect to the leaf nodes. Alternatively, if the content provider targets a leaf node, then the delivery engine is restricted to assigning the ordered advertisements to just that leaf node (e.g., placing impressions for pages that belong to that only that leaf). Accordingly, from the point of view of the delivery engine, parent nodes represent disjunctions of leaf nodes.

The computer software components may be configured to perform additional operations such as identifying a log of booked orders scheduled to be placed within the time segment. Typically, the identified booked orders compete with the candidate order to be placed at each candidate node. In embodiments, the first linear program may be utilized to calculate a number of orders of the candidate order joined with the competing booked orders that are undeliverable. In one instance, calculating the number of orders may be accomplished by comparing the estimated inventory against the joined orders. In sequence, the second linear program may be utilized, along with the calculated number of undeliverable orders, to calculate a portion of the estimated inventory that is substantially nonuniformly delivered and a financial value of the estimated inventory allocated to the candidate order. Upon evaluating these outputs calculated by the first and second linear programs, a decision to accept the candidate order is made. In an exemplary embodiment, when the number of undeliverable orders is low or zero, when a small portion of the estimated inventory is substantially nonuniformly delivered, and when the financial value of the estimated inventory allocated to the candidate order is comparatively minimal, the candidate order is accepted.

BRIEF DESCRIPTION OF THE DRAWINGS

The present invention is described in detail below with reference to the attached drawing figures, wherein:

FIG. 5 is a flow diagram illustrating an overall method for employing one or more linear programs to determine whether to accept a candidate order to place impressions of at least one advertisement based on allocation characteristics, in accordance with an embodiment of the present invention.

DETAILED DESCRIPTION

Figure 1:
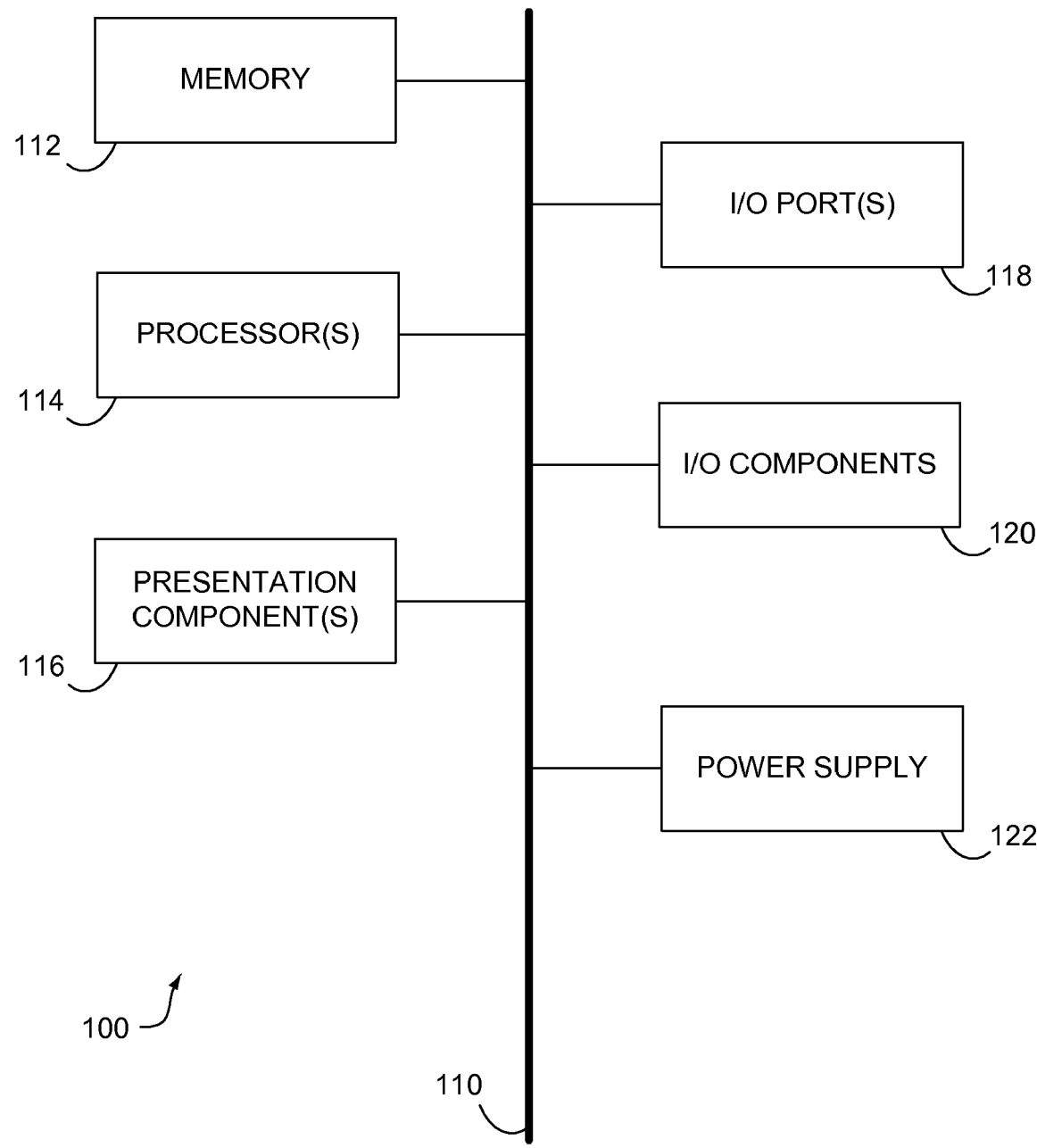
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer systems registers and memories into other data similarly represented as physical quantities within the computer system memories or registers or other such information storage, transmission, or display devices.

Embodiments of the present invention relate to determining whether to accept a candidate order from a content provider, or advertiser, to display a particular number of advertisements within a specified time segment. Initially, the content provider may include placement criteria that, among other things, identify a node at which impressions of the advertisement are expected to be rendered. Generally, a node refers to a location within a topic graph that describes inventory that is permissible to allocate to satisfy the candidate order. To perform the determination, the inventory of impressions available for accommodating the candidate order and a log of booked orders scheduled to be placed within the time segment may be identified. Linear programs are then utilized to determine whether the estimated inventory that satisfies the placement criteria is available by predictively placing the booked orders within the estimated inventory. If available, the candidate order is accepted.

Accordingly, in one embodiment, the present invention relates to computer-executable instructions, embodied on one or more computer-readable media, that perform a method for employing one or more linear programs to determine whether sufficient inventory exists to accept a candidate order. Typically, the candidate order is a request to place impressions of at least one advertisement supplied by a content provider. In embodiments, the method includes receiving the candidate order with associated placement criteria and reading the placement criteria to identify a quantity of impressions of the advertisement(s) to place, a time segment over which the quantity of impressions are anticipated to be placed, and at which node the impressions are expected to be rendered. The node may include a location within a topic graph that represents a specific description of the inventory that is appropriate to allocate to fulfill the candidate order. Generally, the topic graph is a mechanism to organize content of web pages and is composed of a plurality of nodes that are interconnected by way of a parent-child relationship. In one instance, each of the plurality of nodes represents a description of an article of inventory being used to fulfill the booked orders. By way of example, the description of an article of inventory includes properties that expose a context of the web page.

The method may further include the steps of estimating an inventory of impressions that are available for accommodating the candidate order within the time segment and identifying a log of booked orders scheduled to be placed within the time segment. Generally, the identified booked orders that are considered by this method are orders for impressions that compete with the candidate order for impressions to be placed at the leaf node. In an exemplary embodiment, the inventory comprises one or more content regions within the web page that are reserved for presenting impressions as instructed by a delivery engine. Upon gathering the information above, a sequence of linear programs may be employed to determine whether the estimated inventory that satisfies the placement criteria is available. This determination is conducted by predictively placing the competing booked orders at the estimated inventory. When inventory that satisfies the placement criteria is unavailable, a refusal to accept the candidate order may be communicated to the content provider offering the candidate order. Alternatively, when inventory that satisfies the placement criteria is available, the candidate order is accepted and incorporated into the booked orders to be placed at the leaf node and to be considered when determining whether to accept a subsequent order targeting the leaf node.

In another embodiment, aspects of the present invention involve computer-readable media having computer-executable instructions embodied thereon that, when executed, perform a method for employing one or more linear programs to determine whether to accept a candidate order based on allocation characteristics. Initially, the method includes receiving the candidate order with associated placement criteria that indicates a quantity of impressions to place, a time segment over which the quantity of impressions are anticipated to be placed, and at which leaf node the impressions are expected to be rendered. A log of booked orders that are scheduled to be placed within the time segment is identified. But, only those identified booked orders that compete against the candidate order for placements at the leaf node are considered. One or more linear programs are executed to determine whether characteristics of allocating to the booked orders the impressions that meet the placement criteria are affected upon accepting the candidate order. A result of this determination is generally stored at a delivery engine or conveyed to a content provider submitting the candidate order.

As utilized herein, the term "inventory" is meant to be limiting, but may encompass any online space that is for sale. In one embodiment, inventory relates to one or more impressions being sold to an advertiser from a delivery engine. Impressions are revealed upon a user navigating to a specific web page that publishes an advertisement. The impression may be published at any content regions (e.g., banner, side rails, footer of the web page, and the like), or locations, on the web page that can accommodate an ad. Accordingly, a daily inventory may be calculated by multiplying the impressions published by each web page, by the number of web pages that are accessible to the delivery engine (assuming, in this instance, that each web page has the same number of ad slots), and by the number of times each of the web pages are launched by end users within a day. As more fully discussed below, the ads that are selected by the delivery engine for placement within a web page are typically selected based on the context of the web page or on the known attributes of the user visiting the web page.

In another embodiment, the inventory may be any type of commerce-related product or service placement in which a collection of items is be managed. In the case of targeted advertising applications, the inventory to be managed are ad impressions. In other inventory management applications, the inventory to be managed can be, for example, products that need to be sold. For example, there may be a limited number of a certain kind of product to be sold, such that the use of an embodiment of the invention describes the best way in which to advertise the selling of the products.

Thus, embodiments of the present invention are said to pertain to allocating an inventory of impressions to fulfill orders, such that a given ad can be selected and displayed as an impression. In other instances, the invention pertains to allocation of any item, such as physical advertising space, such that a given item can be selected and effected, where in the case of ads, effected means displayed. Besides ads, items can include products, services, etc. Furthermore, the effecting of an item can mean other things besides the displaying of an ad, such as the displaying of a button on a web site for immediate purchase of an item.

Accordingly, embodiments of the present invention relate to a way to book orders (i.e., requests for a certain amount of inventory (impressions) over a time period), and to distribute the booked orders to appropriate web pages. As more fully discussed below, the appropriate web pages, or placement of the impressions, are governed by which node is targeted by a content provider. Generally content providers can employ targeting to focus on a node and/or other indicia of a web page context. Further, the content providers may employ targeting to limit the placements of an advertisement based on user-demographics (e.g., gender, age, and the like), user behaviors, and other criteria that the delivery engine can access and use to filter the impressions.

Generally, the delivery engines can accept orders upon the content provider paying a premium for a number of impressions, or conducting an advertising auction includes receiving bids submitted by the content provider or competing customers. However, bids of competing customers are not generally considered in the model discussed below because once an order is listed as booked, the monetary transaction has transpired. But, the bids can be incorporated into the first objective function to define advertiser-specific constants that represent the relative importance of each advertiser to the content provider. The advertiser-specific constants are represented by a constant AV (advertiser value) in the linear program. Accordingly, if the delivery engine is faced with the need to underdelivering ads of accepted orders, the AV is used to determine which ads not to place. In one embodiment, the AV helps demonstrate the underdelivery cost, where the underdelivery cost is typically higher for the higher-paying advertisers. That said, if the high-paying advertisers do not really care that impressions are underdelivered, but a medium-paying advertiser is threatening to cancel all future deals upon seeing an underdelivered order, then the AV will take into account this characteristic as well as the bid values of the advertisers.

As used herein, the phrase "delivery engine" is not meant to be limiting but may encompass any entity or software that manages filling orders and/or conducts transactions that facilitate surfacing ad impressions. The delivery engine is discussed more fully below with reference to FIG. 2.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
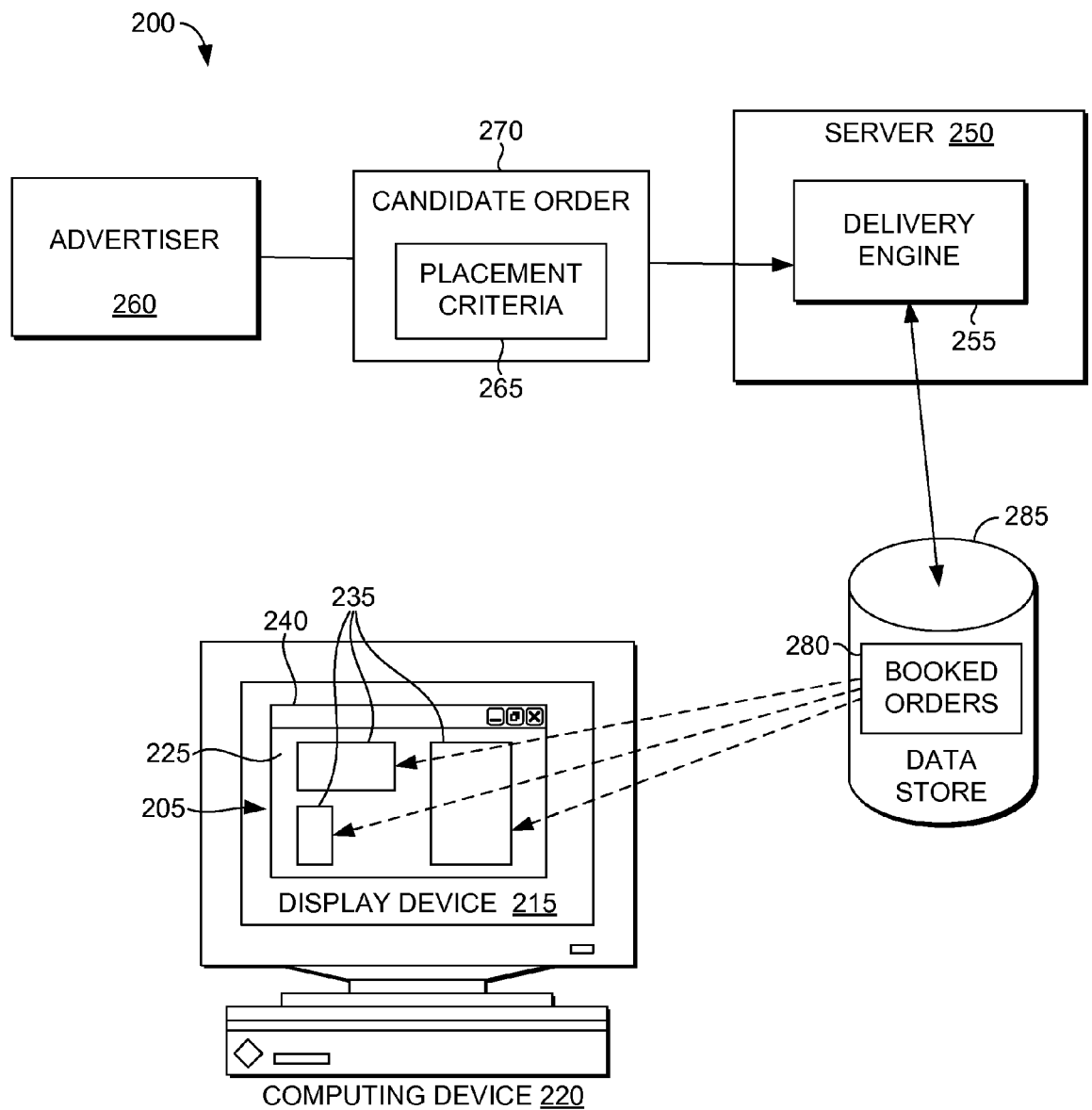
FIG. 2 is a schematic diagram of an exemplary system architecture suitable for use in implementing embodiments of the present invention.

Turning now to FIG. 2, a schematic diagram of an exemplary system architecture 200 suitable for use in implementing embodiments of the present invention is shown, in accordance with an embodiment of the present invention. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

As illustrated, the system architecture 200 may include a distributed computing environment, where a computing device 220 is operably coupled to a server 250. In embodiments of the present invention that are practiced in the distributed computing environments, the operable coupling refers to linking the computing device 220 to the server 250, and other online components (e.g., booked orders 280 within the data store 285) through appropriate connections. These connections may be wired or wireless. Examples of particular wired embodiments, within the scope of the present invention, include USB connections and cable connections over a network 201. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 220 and the remote server 250, for instance, are not limited by the examples described, but embrace a wide variety of methods of communications. In another embodiment, the computing device may internally accommodate the functionality of the server 250, thereby alleviating dependence on wireless or wired connections.

Exemplary system architecture 200 includes the computing device 220 for, in part, supporting operation of the display device 215. The computing device 220 is configured to present a graphical user interface (GUI) workspace 205 (e.g., UI display) on the display device 215. In one instance, the GUI workspace can present a display area 230 that contains a web page 225. The web page 225 may include one or more content regions 235 that present one or more impressions of ads to an end user that has navigated to the web page 225. The display device 215 may be configured as any display device (e.g., presentation component 116 of FIG. 1) that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected.

In one exemplary embodiment, the GUI workspace 205 rendered by the display device 215 is configured to surface the web page 225 that is associated with a search engine and/or content publisher. In embodiments, the web page 225 may reveal resultant content discovered by searching the Internet with a search term. The search term may be manually provided by a user at a query-entry area, or may be automatically generated by software. In addition, the search term may relate to a keyword that invokes surfacing ad impressions within the content regions 235. In other embodiments, the ad impressions rendered at the content regions 235 of the web page 225 may be selected by way of user-demographics of the end user navigating to the web page 225, content within the web page 225, a general context of the web page 225, a time of day, a day of the week, etc.

The server 250 and the computing device 220, shown in FIG. 2, may take the form of various types of computing devices, such as, for example, the computing device 100 described above with reference to FIG. 1. By way of example only and not limitation, the server 250 and/or the computing device 220 may be a personal computer, desktop computer, laptop computer, consumer electronic device, handheld device (e.g., personal digital assistant), various remote servers, processing equipment, and the like. It should be noted, however, that the invention is not limited to implementation on such computing devices but may be implemented on any of a variety of different types of computing devices within the scope of embodiments of the present invention.

Further, in one instance, the server 250 accommodates search engine software (not shown) designed for searching for information (e.g., user demographics) on the Internet and for gathering Internet search results in response to a user-submitted query. The Internet search may invoke the delivery engine 255 to select and surface ad impressions that satisfy the booked orders 280. In one embodiment, the search engine includes one or more web crawlers that mine available data (e.g., newsgroups, databases, or open directories) accessible via the Internet and build a table containing web addresses along with the subject matter of web pages identified as the search results that are relevant to search terms within the user-submitted query. The search engine may be accessed by Internet users through a web-browser application represented by the web page 225.

In another instance, the server 250 accommodates the delivery engine 255. Typically, the delivery engine 255 is configured to perform various tasks, including determining whether to accept a candidate order 270 from an advertiser 260, or content provider (e.g., utilizing the linear programs) and determining how to allocate impressions to the currently booked orders 280. In embodiments, the candidate orders 270 are associated with placement criteria 265 that indicates, among other things, a quantity of impressions of at least one advertisement to place, a time segment over which the quantity of impressions are anticipated to be placed, and at which content node the impressions are expected to be rendered. Although three different configurations of the placement criteria 265 have been described, it should be understood and appreciated by those of ordinary skill in the art that other types of suitable properties of an order may be specified in the placement criteria 265, and that embodiments of the present invention are not limited to those order attributes of the placement criteria 265 described herein. For instance, the placement criteria 265 may include, but is not limited to, one or more of the following properties: user-demographics, a time frame within a day to render the impressions, particular days (s) within the week to render the impressions, and websites that should be avoided when placing ads.

Now, processes conducted by the delivery engine 255 will be discussed with reference to one or more linear programs executed thereby. For ease of explanation, syntactic conventions for representing the linear programs will be used. Generally, variables are denoted with lower-case symbols (e.g., xijt, µj), and constants are denoted with upper-case symbols (e.g., Gj, D). Sets of variables and constants are denoted with bold-face lower-case symbols (e.g., x) and bold-face upper-case symbol (e.g., Uj), respectively.

By way of background, and as discussed below, nodes in the content hierarchy can represent sets of leaf nodes. The linear program allocates orders to the leaf nodes, regardless of whether or not the order was placed at a leaf node or a non-leaf node. For example, an order for a certain number of impressions on a non-leaf "sports" node can be allocated to leaf nodes "sports\tennis," "sports\football," etc., assuming that tennis and football are the most specific descriptions of sports available in the topic graph hierarchy.

In general, the delivery engine 255 is responsible for selecting the booked orders 280 to satisfy. For instance, when an impression from a web page associated with a leaf node i is ready for receiving an impression, the delivery engine 255, in time segment t, examines all matching order lines j whose impression goals $x_{ijt}$ have not been met. These order lines are identified and sorted by priority. If there is a unique order line with a highest priority, the impression is delivered to that order line. Otherwise, the delivery engine 255 chooses uniformly at random between all highest-priority order lines.

Figure 3:
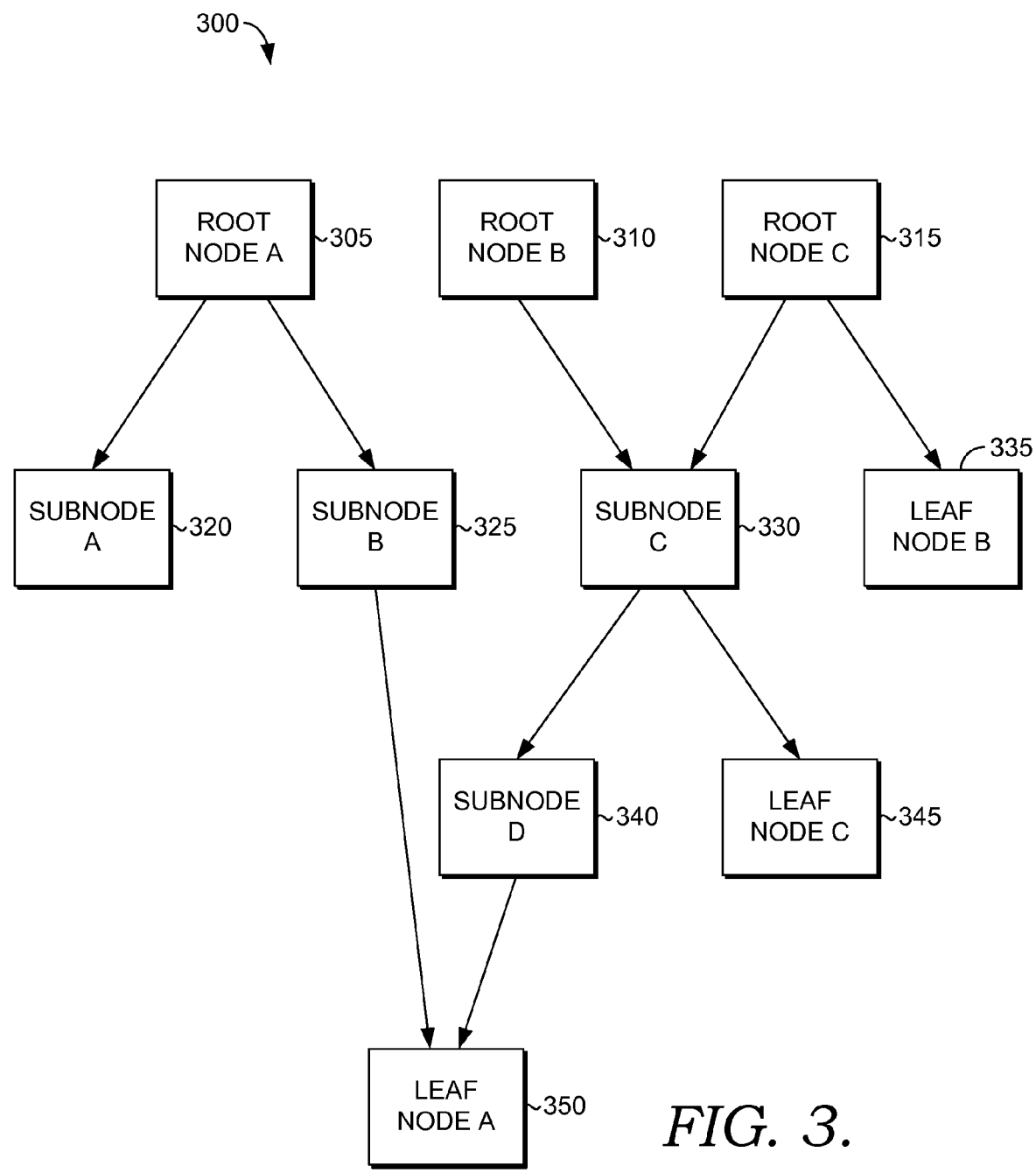
FIG. 3 is an exemplary graphical depiction that illustrates a plurality of interconnected nodes located within a content graph, in accordance with an embodiment of the present invention.

As utilized herein, the phrase "leaf node" is not meant to be limiting, but may encompass any description of a web page. In one instance, the leaf node comprises a location within a topic graph that represents a specific description of the inventory that is permissible to allocate to satisfy the candidate order. A topic graph is shown at FIG. 3. In particular, FIG. 3 is an exemplary graphical depiction that illustrates a plurality of interconnected nodes located within a content graph 300, in accordance with an embodiment of the present invention. The topic graph 300 is composed of a plurality of nodes that are interconnected by way of a parent-child relationship, where each of the plurality of nodes represents a description of an article of the inventory (e.g., content region on a web page) being used to fulfill the booked orders. In another instance, the description of an article of inventory includes properties that expose a context of a web page.

The topic graph 300 may be arranged in any form or style know to one of ordinary skill in the art. In one instance, the topic graph 300 is a hierarchical organization of content within a web page. In another instance, a generalized hierarchy of the nodes may not fit within a standard tree-style pattern. For instance, a parent (e.g., root node C 315) may have a plurality of children (e.g., subnode C 330 and leaf node B 335), while a child (e.g., subnode C 330) may have a plurality of parents (e.g., root node B 310 and root node C 315). By way of example, the parent (e.g., root node C 315) may represent all web pages that include sports-related content, and have a plurality of children (e.g., subnode C 330 and leaf node B 335). The children, subnode C 330 and leaf node B 335, may be related to a narrower field of sports, such as football and baseball respectively.

Also, as discussed above, each child may have various parents. By way of example, the child (e.g., subnode C 330) may represent a characterization of football and may have parent topical descriptions of both sports (e.g., root node C 315) and outdoor activities (e.g., root node B 310). Accordingly, the higher up the node on the topic graph 300, the more general or topical the description of the web page. In contrast, the farther down the node on the topic graph 300, as illustrated, the more narrowed the characterization of the web page. The most focused descriptions of web pages are represented by the leaf nodes A 350, B 335, and C 345. These nodes do not have children and can be utilized to filter which impressions are associated with which orders.

Generally, the topic graph 300 describes, for any piece of inventory, the topical content by a path name. Advertisers can use the path name to target inventory that is relevant to their advertisements. Accordingly, the placement of the advertiser's ads within a content region is effective to generate revenue for the advertiser. As such, the advertiser may submit an order for a particular amount of advertisements to be placed, within a time frame, at impressions that are targeted by a path name.

The decision of whether to accept a new order will now be discussed with reference to the leaf nodes. In embodiments of the present invention, the delivery engine responsible for determining whether to accept a new order, or "candidate order," from an advertiser. This determination may be facilitated by executing one or more linear programs. Linear programs are employed to solve linear objective functions with variables that an operator can control and with constraints that are linear. Accordingly, linear functions can express optimization problems as a linear object function, thus, computing tools can easily solve for the optimal setting of the variables efficiently.

Those of ordinary skill in the art will recognize that this linear program may be solved by any of a variety of methods within the prior art. In one embodiment, for example, the Simplex Algorithm, developed in the 1940s and known within the art is used. The Simplex Algorithm is an iterative procedure for solving linear programming problems, which include finding the optimum of a linear function subject to a number of linear constraints. The Simplex Algorithm is thus a computational tool for solving linear programming problems and is able to provide fast solutions to large-scale applications. Solving the linear program presented above and below thus yields the allocation of ads within the inventory, such that the placement criteria is met.

Initially, a first linear program is executed to ascertain whether by adding the new order, will underdelivery of the currently booked orders occur. The first linear program includes a first objective function that attempts to minimize a risk of underdelivery when considering adding the candidate order. In particular, the first object function is configured to always allocate impressions to orders that are booked in the system. If conditions arise (e.g., given a lowered capacity forecast) that prevent all order from being delivered, the first object function prefers to under deliver on low-valued order lines than on high-valued order lines. Accordingly, the first linear program attempts to minimize the underdelivery cost. This minimum underdelivery cost is later input as a constraint to the second linear program, which optimizes two other objectives simultaneously using a linear trade-off term.

In a particular embodiment, the first linear program identifies an allocation x for the delivery engine, and calculates an underdelivery amount μj for each candidate and booked order. The first object function of the first linear function may be expressed as $$\sum_j AV_j u_j,$$

which, when minimized, minimizes a risk of underdelivering the booked order over a time segment. As discussed above, $u_j$ represents a number of the booked orders that will be potentially undelivered upon accepting the candidate order and $AV_j$ represents a weighting assigned to at least one customer that submitted the booked orders. The weighting may be assigned based an any number of characteristics of a customer, such as a bid (e.g., function of price per impression in a campaign), and the value attached to the particular advertiser. This value may be low if the advertiser does not pay on time or may be high if the advertiser has a long-term contract and/or relationship with the delivery engine. Accordingly, $AV_j u_j$ represents a cost to the delivery engine, adjusted per each customer, for underdelivering an order. That is, the delivery engine incurs a cost of AVj for each non-delivered impression that occurs.

Within the first linear function, the objective function is minimized while subject to constraints. Minimizing the object function of the first linear program subject to constraints may include minimizing the object function subject to a first constraint $$\forall_j u_j \geq 0$$

of the first linear program. This first constraint functions to ensure that the delivery engine will not over-deliver the booked orders. In other words, the first constraint ensures no bonus is awarded for showing more impressions than were order by, or promised to, the advertiser, as no credit for over-delivering is typically given.

Further, minimizing the first object function of a first linear program subject to constraints may include minimizing the first object function subject to a second constraint $$\forall_j \sum_{i \in L_j, t \in T_j} x_{ijt} = G_j - u_j$$

of the first linear program. In this constraint, $G_j$ represents the log of the booked orders scheduled to be placed at the leaf node within the time segment. In embodiments, $X_{ijt}$ represents a solution vector (e.g., three-dimensional matrix, tensor, and the like) that specifies available allocations for the leaf node i during a time segment t. The variable j, as used herein, corresponds to the customer placing the order. Generally, solving the first object function in conjunction with the second constraint of the first linear program provides equivalence between the potential undelivered booked orders and the scheduled booked orders with consideration of periods of time $T_j$ within the time segment that the candidate order is active (e.g., only displaying ads on Mondays). The constant L represents the leaf node, or a set of leaves, that match the candidate order, or the leaf nodes that satisfy the target (e.g., path name) of the candidate order. Accordingly, the second constraint represents the delivery goals of the delivery engine and provides the equivalence between the μj variable and the number of underdelivered impressions.

In addition, minimizing a first object function of a first linear program subject constraint(s) may include minimizing the first object function subject to a third constraint $$\forall_{i,j,t} \ x_{ijt} \leq C_{it}S_{it}(j)p(U_j) - \sum_{k \neq js, t, R_k \geq R_j} x_{ikt} \frac{S_{it}(j,k)}{S_{it}(k)} p(U_j | U_k)$$

of the first linear program. In operation, the third constraint ensures that the delivery engine cannot deliver, or allocate, more impressions than are estimated to be available at a leaf node per a time frame. In embodiments, the impressions that estimated to be available are based on a predicted number of user visits within a particular placement criteria. In addition to leaf nodes, the third constraint considers customers that are specifying demographics and is cognizant of the people's characteristics that are actually visiting a web page. For instance, the third constraints can look at 100 impressions available within the context football and see that only 30 impressions are generated by female visitors.

Generally, the first term $C_{it}S_{it}(j)p(U_j)$ represents the estimated inventory of impressions available that meet the placement criteria. That is, the first term represents a number of impressions available for order line j for leaf node i at time t, assuming no other orders are in the delivery engine. In particular, $C_{it}$ represents the total number of impressions that are expected to occur at a leaf node j within a segment of time t (e.g., 100 impressions per day at football web pages). $S_{it}$ represents the fraction of total impression volume at leaf node i that will arrive during time segment t in which order line j will be active. For example, if t is a one-day period covered by an order line j that specifies day-part targeting focusing on mornings, and if a third of the total daily hours at leaf node i on day t arrives during the morning, then $S_{it}=\frac{1}{3}$. That is, $S_{it}$ represents a fraction of time available a customer that is interested in portioning the delivery over sections of a day (e.g., targeting hours within the day). pUj represents the probability that an impression at leaf node i will match the targets Uj. Accordingly, the first term finds the total number of impressions available during the time period t targeting the leaf node $C_{it}$, of which only a fraction $S_{ijt}$ will be available during the time that order j is active. Of these remaining impressions, a fraction $p(U_j)$ will actually match the targeting criteria of order j.

The second term $$\sum_{k \neq js, t, R_k \geq R_j} x_{ikt} \frac{S_{it}(j,k)}{S_{it}(k)} p(U_j | U_k)$$

represents a portion of the estimated inventory of impressions that is ostensibly allocated to the booked orders submitted by customers that have a priority level which ranks higher or equal to a priority level assigned to an advertiser submitting the candidate order. In particular, the second term represents inventory that is subtracted away from the total available to order j due to the delivery engine serving impressions to orders of higher priority. In particular, for each competing order k with higher priority, the total number of impressions served to order k during the time segment t is $x_{ikt}$. Of these served impressions, a fraction are served during the time that both order j (candidate order) and order k (booked order) are active. Because, all of these impressions served to order k satisfy the targets Uk of the orders, the impressions that could have been delivered to order j and are not available due to order line k are represented by $p(U_j|U_k)$. The ratio represents an overlap in inventory volume that the customers and content provider compete for (e.g., percent of available volume per day is in competition with the candidate order). The variable p represents an overlap in targeted space. If disjoint (e.g., one customer targets male and a competitor targets female) then P=0.

Stated another way, the second term operates to subtract the impressions from candidate order that are directly competing against the advertiser submitting the candidate orders. However, only those impressions associated with competing customers of a higher priority are subtracted. For instance, priority is based on how an advertiser is targeting. By way of example, if customer 1 is targeting males, while customer 2 is targeting males over 18, customer 2 is granted higher priority because their placement criteria is more specific and the impressions within the inventory are more rare, thus, harder to find. However, in embodiments, customers that target gender will be given higher priority than content providers submitting orders that specify age. Because, these demographics do not directly overlap, the third constraint is conservative, so as not to over-allocate. Consequently, this conservative approach may prevent the engine from allocating inventory that it has available.

As such, minimizing the first object function subject to the third constraint of the first linear program comprises determining a number of impressions, which satisfy the placement criteria, within the estimated inventory that are available upon removing those impressions allocated to the high-priority-level customers. During this determination, the third constraint takes into account the active time periods and user-demographics designated by the booked orders. Typically, the placement criteria specifies the active time periods and the user-demographics associated with placing the candidate order.

Accordingly, upon solving the objective function using the three constraints above, the objective function will be zero if and only if there exists a capacity-conforming allocation that meets all of the delivery goals with no under delivery. If no such allocation exists, the first linear program will identify the allocation in which the underdeliver cost is minimized.

Now, the second linear program will be discussed. The second linear program attempts to achieve two goals, minimizing both nonuniformity (i.e., maximizing smoothness of delivery) and minimizing the value of booked impressions. The first goal of maximizing smoothness aspires to deliver impressions uniformly over time to a user, so that a customer's ads are not bunched together. For instance, if a customer has an order to show one million shoe ads, the first goal attempts to distribute the ads evenly over the targeted time segment instead of showing all ads on the last day of the time segment. In other words, the first goal should manage the impressions in inventory to deliver the impressions to all advertisers across time uniformly. In embodiments, the more valuable the order, the higher the cost assigned to deviating from this smoothness constraint.

The second goal of minimizing the value of booked impressions attempts to maximize the opportunity for allocating a leaf node, subnode, or root node in the topic graph to an order. If a node can be allocated easier because it corresponds with more orders, it may be more valuable. Or, if there is a large demand, and corresponding high payments, for a node, then there is a sense of how much it is worth and what the delivery engine can charge for impressions at that node. Accordingly, the second goal aspires to allocate the orders in such a way as to leave open the valuable inventory. In other words, the allocation should preserve valuable inventory for future sale. In particular, premium inventory should not be sold at a discount when early in the sales cycle it would likely sell at a premium later.

Although, these two goals, discussed above, are important to the decisions of the delivery engine, the sequence of linear programs values the objective of preventing underdelivery vastly more that either of the two goals of the second linear program. That is, given any two allocations, the delivery engine will always prefer the one in which the underdelivery cost is smaller.

As with the first linear program, the second linear program includes an objective function that is minimized subject to constraints. The second object function $$\left(\sum AV_j \delta_{jt}\right) + \Gamma\left(\sum_{ijt} X_{ijt} R_i\right)$$

of a second linear program includes two terms. The first term $$\left(\sum AV_j \delta_{jt}\right)$$

represents a uniformity at which the impressions are delivered throughout the time segment, thus, aligned with the first goal. In this first term, $\delta_{jt}$ represents the deviation that is beyond an allowed range of deviation. The greater this value, the less uniform the distribution of the impressions. The second term $$\Gamma\left(\sum_{ijt} X_{ijt} R_i\right)$$

of the two terms in the second linear function represents a value of the impressions that are allocated to the booked orders, thus, aligned with the second goal of maximizing the value of what is left, or minimizing the value of what is allocated for booked orders. In this second term, $\Gamma$ represents a weighting that balances the importance of the two goals.

This second object function may be minimized using various constraints. In one instance, the various constraints may include a first constraint $$\forall_j \sum_{i \in L_j, t \in T_j} x_{ijt} = G_j - M_j$$

of the second linear program. In this first constraint, $M_j$ represents a predetermined number of the booked orders that are undelivered upon accepting the candidate order. That is, the value of $u_j$ that is discovered by solving the first linear program is input into the first constraint of the second linear question as constant $M_j$. Additionally, $G_j$ represents the log of the booked orders scheduled to be placed at the leaf node within the time segment.

In embodiments, the object function of the second linear program may be minimized using a second constraint, which is similar to the third constraint applied to the object function of the first linear program. Accordingly, the second constraint will not be discussed again.

In an exemplary embodiment, the second object function of the second linear program is subject to a third constraint $$\forall_{j,t} \left[\sum_{i \in L_j} x_{ijt} - F_{jt} G_j\right] \leq DF_{jt} G_j + \delta_{jt}$$

of the second linear program. The first term $$\forall_{j,t} \left[\sum_{i \in L_j} x_{ijt} - F_{jt} G_j\right]$$

represents an accumulated difference between a uniform distribution and a scheduled allocation of the impressions over the time segment t. In particular, $F_{jt}$ represents the fraction of a total advertising campaign time that order j will be active during time segment t. For example, if t is a one-day period covered by the order j that is running for seven days, Fjt=1/7.

Generally, the second term $DF_{jk}G_j$ represents a variation-tolerance threshold, and $\delta_{jt}$, as discussed above, represents a distance of deviation from a prescribed range of uniformity. The sum of these elements represents the total number of impressions delivered to order j in time segment t. If the allocation were perfectly uniform across time, then the fraction of the delivery goal $G_j$ that would be delivered in this time segment would be $F_{jt}$ (i.e., the fraction of total campaign time spent in segment t). Fixed constant D is the range (e.g., number of impressions) that the delivery engine allows the allocation to deviate from a perfect uniformity. If any allocation is not within this fixed constant, a positive value of $\delta_{jt}$ is generated in order to not violate the third constraint. A higher value of $\delta_{jt}$ will incur a higher cost in the second objective function.

Upon solving the first and second linear programs in sequence, the delivery engine will know whether to accept the candidate order (e.g., there will be no underdelivery, or a smaller cost of underdelivery than accepting the candidate order). Further, if accepting the candidate order makes all the orders nonuniform (e.g., utilizing the second linear program), then the delivery engine may make a decision to turn down the candidate order. In addition, the delivery engine can use the results of the linear programs to determine if the constraints are still accurate. For instance, the delivery engine may determine that the estimate of inventory is not appropriate based on the results of solving the linear programs and issue an updated inventory estimate.

Figure 4:
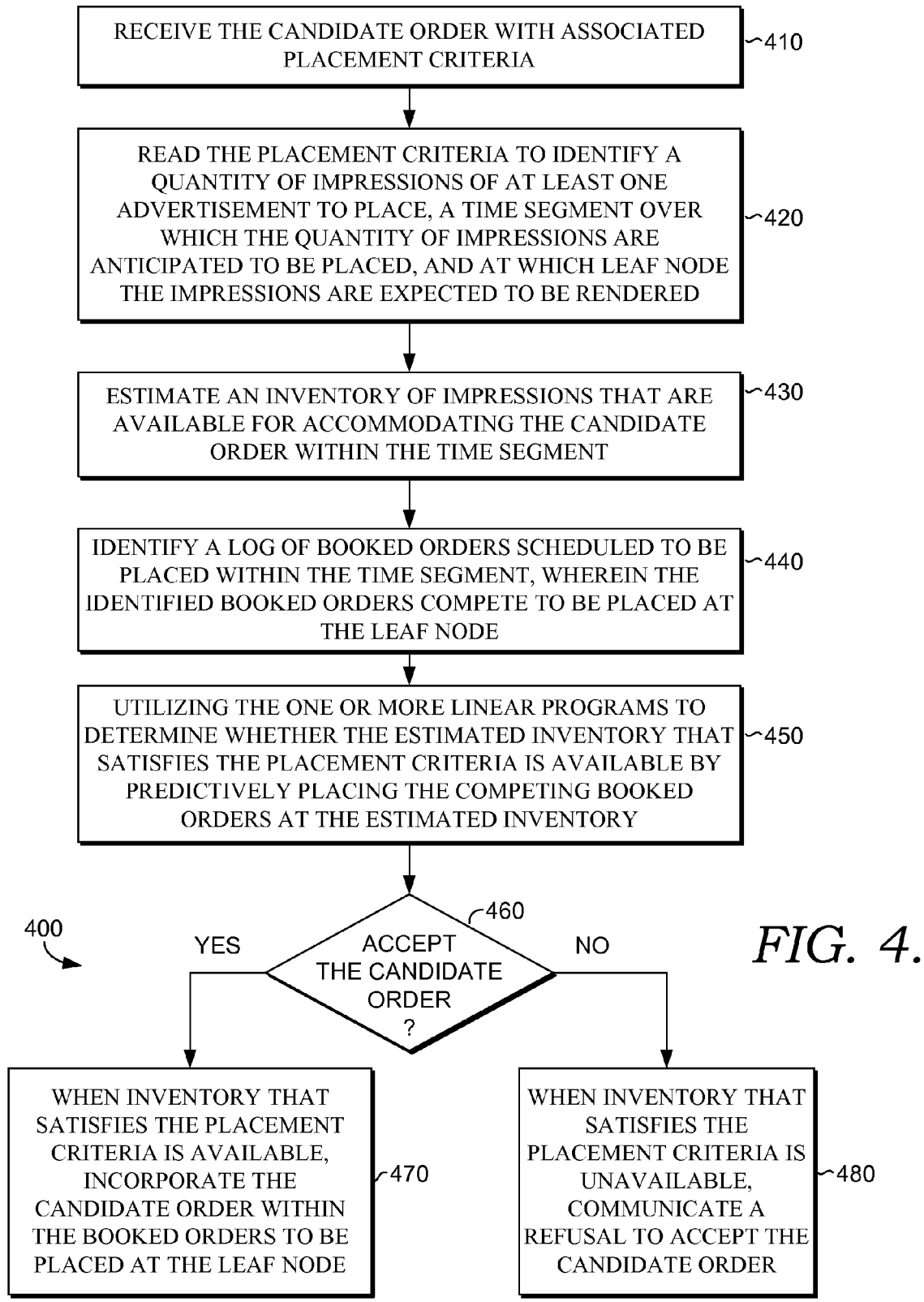
FIG. 4 is a flow diagram illustrating an overall method for employing one or more linear programs to determine whether sufficient inventory exists to accept a candidate order to place impressions of at least one advertisement, in accordance with an embodiment of the present invention.

Turning now to FIG. 4, a flow diagram is shown illustrating an overall method 400 for employing one or more linear programs to determine whether sufficient inventory exists to accept a candidate order to place impressions of at least one advertisement, in accordance with an embodiment of the present invention. In one embodiment, computer-executable instructions, embodied on one or more computer-readable media, are configured to perform the method 400 by employing a sequence of linear programs. Typically, the candidate order is a request to place impressions of at least one advertisement supplied by a content provider. In embodiments, the method includes receiving the candidate order with associated placement criteria (see block 410) and reading the placement criteria to identify a quantity of impressions of the advertisement(s) to place, a time segment over which the quantity of impressions are anticipated to be placed, and at which leaf node the impressions are expected to be rendered (see block 420). The leaf node may include a location within a topic graph that represents a specific description of the inventory that is appropriate to allocate to fulfill the candidate order. Generally, the topic graph is a mechanism to organize content of web pages and is composed of a plurality of nodes that are interconnected by way of a parent-child relationship. In one instance, each of the plurality of nodes represents a description of an article of inventory being used to fulfill the booked orders. By way of example, the description of an article of inventory includes properties that expose a context of the web page.

The method 400 may further include the steps of estimating an inventory of impressions that are available for accommodating the candidate order within the time segment (see block 430), and identifying a log of booked orders scheduled to be placed within the time segment (see block 440). Generally, the identified booked orders that are considered by this method are orders for impressions that compete with the candidate order for impressions to be placed at the leaf node. In an exemplary embodiment, the inventory comprises one or more content regions within the web page that are reserved for presenting impressions as instructed by a delivery engine. Upon gathering the information above, a sequence of linear programs (e.g., utilizing the first linear program) may be employed to determine whether the estimated inventory that satisfies the placement criteria is available, as depicted at block 450. This determination is conducted by predictively placing the competing booked orders at the estimated inventory. This is depicted at block 460. When inventory that satisfies the placement criteria is unavailable, a refusal to accept the candidate order may be communicated to the content provider offering the candidate order. This is depicted at block 480. Alternatively, when inventory that satisfies the placement criteria is available, the candidate order is accepted and incorporated into the booked orders to be placed at the leaf node and to be considered when determining whether to accept a subsequent order targeting the leaf node. This is depicted at block 470.

With reference to FIG. 5, a flow diagram is shown illustrating an overall method 500 for employing one or more linear programs to determine whether to accept a candidate order based on allocation characteristics, in accordance with an embodiment of the present invention. Initially, the method 500 includes receiving the candidate order with associated placement criteria that indicates a quantity of impressions to place, a time segment over which the quantity of impressions are anticipated to be placed, and at which leaf node the impressions are expected to be rendered. This is depicted at block 510. As depicted at block 520, a log of booked orders that are scheduled to be placed within the time segment are identified. But, only those identified booked orders that compete against the candidate order for placements at the leaf node are considered. As depicted at block 530, one or more linear programs (e.g., utilizing the second linear program) are executed to determine whether characteristics of allocating to the booked orders the impressions that meet the placement criteria are affected upon accepting the candidate order. A result of this determination is generally stored at a delivery engine or conveyed to a content provider submitting the candidate order. This is depicted at block 580.

In one instance of the method 500, utilizing the linear program(s) to determine whether characteristics of allocating the impressions are affected includes, at least, the following calculations: estimating an inventory of impressions that are available for accommodating the candidate order within the time segment (see block 540); assuming that the candidate order is accepted, ascertaining whether the estimated inventory is nonuniformly delivered to such a degree that a variation-tolerance threshold is overcome (see block 550); and, when the variation-tolerance threshold is overcome, denying acceptance of the candidate order (see block 570). In another instance, utilizing the linear program(s) to determine whether characteristics of allocating the impressions are affected includes performing the following steps: estimating an inventory of impressions that are available for accommodating the candidate order within the time segment (see block 540); assuming that the candidate order is accepted, ascertaining whether a predetermined quantity of high-value impressions within the estimated inventory are allocated to the booked orders (see block 560); and, when the predetermine quantity of the high-value impressions, or more, is allocated to the booked orders, denying acceptance of the candidate order (see block 570).

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-storage media having computer-executable instructions embodied thereon that, when executed by a processor, perform a method for employing one or more linear programs to determine whether sufficient inventory exists to accept a candidate order to place impressions of at least one advertisement, the method comprising:

receiving the candidate order with associated placement criteria;

reading the placement criteria to identify a quantity of impressions of at least one advertisement to place, a time segment over which the quantity of impressions are anticipated to be placed, and at which leaf node the impressions are expected to be rendered;

estimating an inventory of impressions that are available for accommodating the candidate order within the time segment;

identifying a log of booked orders scheduled to be placed within the time segment, wherein the identified booked orders compete to be placed at the leaf node;

utilizing the one or more linear programs to determine whether the estimated inventory that satisfies the placement criteria is available by predictively placing the competing booked orders at the estimated inventory, wherein determining whether the inventory that satisfies the placement criteria is available involves minimizing a risk of underdelivering the booked orders over the time segment, upon aggregating the candidate orders therewith, by minimizing a first object function $$\sum_j AV_j u_j$$

of a first linear program subject to at least one constraint, wherein $u_j$ represents a number of the booked orders that will be potentially undelivered upon accepting the candidate order and $AV_j$ represents a weighting assigned to at least one customer that submitted the booked orders; and when inventory that satisfies the placement criteria is unavailable, communicating a refusal to accept the candidate order.

2. The media of claim 1, wherein the leaf node comprises a location within a topic graph that represents a specific description of the inventory that is permissible to allocate for satisfying the candidate order.

3. The media of claim 2, wherein the topic graph is composed of a plurality of nodes that are interconnected by way of a parent-child relationship, wherein each of the plurality of nodes represents a description of an article of the inventory being used to fulfill the booked orders.

4. The media of claim 3, wherein the description of an article of inventory comprises properties that expose a context of a web page, and wherein the inventory comprises one or more content regions within the web page that are reserved for presenting impressions as instructed by a delivery engine.

5. The media of claim 4, wherein estimating an inventory of impressions that may be accommodated within the time segment comprises predicting a number of user visits to web pages, within the time segment, whose context is encompassed within the specific description of the leaf node.

6. The media of claim 1, the method further comprising:

when inventory that satisfies the placement criteria is available, accepting the candidate order; and incorporating the candidate order within the booked orders to be placed at the leaf node and to be considered when determining whether to accept a subsequent order targeting the leaf node.

7. The media of claim 1, wherein minimizing a first object function of a first linear program subject to at least one constraint comprises minimizing the first object function subject to a first constraint $\forall_j u_j \geq 0$ of the first linear program, wherein the method further comprises ensuring that the delivery engine will not over-deliver the booked orders by solving the first object function in conjunction with the first constraint of the first linear program.

8. The media of claim 7, wherein minimizing a first object function of a first linear program subject to at least one constraint comprises minimizing the first object function subject to a second constraint $$\forall_j \sum_{i \in L_j, t \in T_j} x_{ijt} = G_j - u_j$$

of the first linear program, wherein $G_j$ represents the log of the booked orders scheduled to be placed at the leaf node within the time segment, wherein solving the first object function in conjunction with the second constraint of the first linear program provides equivalence between the potential undelivered booked orders and the scheduled booked orders with consideration of periods of time $T_j$ within the time segment that the candidate order is active.

9. The media of claim 8, wherein minimizing a first object function of a first linear program subject to at least one constraint comprises minimizing the first object function subject to a third constraint $$\forall_{i,j,t}\, x_{ijt} \leq C_{it} S_{it}(j) p(U_j) - \sum_{k \neq j\, s.t.\, R_k \geq R_j} x_{ikt} \frac{S_{it}(j,k)}{S_{it}(k)} p\langle U_j \mid U_k \rangle$$

of the first linear program, wherein a first term $C_{it}S_{it}(j)p(U_j)$ represents the estimated inventory of impressions available that meet the placement criteria and a second term $$\sum_{k \neq j\, s.t.\, R_k \geq R_j} x_{ikt} \frac{S_{it}(j,k)}{S_{it}(k)} p\langle U_j \mid U_k \rangle$$

represents a portion of the estimated inventory of impressions that is ostensibly allocated to the booked orders submitted by customers that have a priority level which ranks higher or equal to a priority level assigned to an advertiser submitting the candidate order.

10. The media of claim 9, wherein minimizing the first object function subject to a third constraint of the first linear program comprises ascertaining a number of impressions, which satisfy the placement criteria, within the estimated inventory that are available upon removing those impressions allocated to the high-priority-level customers while taking into account the active time periods and user-demographics designated by the booked orders, wherein the placement criteria specify the active time periods and the user-demographics associated with placing the candidate order.

11. One or more computer-storage media having computer-executable instructions embodied thereon that, when executed by a processor, perform a method for employing one or more linear programs to determine whether to accept a candidate order to place impressions of at least one advertisement based on allocation characteristics, the method comprising:

receiving the candidate order with associated placement criteria that indicates a quantity of impressions to place, a time segment over which the quantity of impressions are anticipated to be placed, and at which leaf node the impressions are expected to be rendered;

identifying a log of booked orders scheduled to be placed within the time segment, wherein the identified booked orders compete to be placed at the leaf node;

utilizing the one or more linear programs to determine whether characteristics of allocating to the booked orders the impressions that meet the placement criteria are affected upon accepting the candidate order, wherein determining whether characteristics of allocating the impressions are affected comprises minimizing a second object function $$\left(\sum AV_j \delta_{jt}\right) + \Gamma\left(\sum_{ijt} X_{ijt} R_i\right)$$

of a second linear program subject to at least one constraint, wherein a first term $$\left(\sum AV_j \delta_{jt}\right)$$

represents a uniformity at which the impressions are delivered throughout the time segment, and a second term $$\Gamma\left(\sum_{ijt} x_{ijt} R_i\right)$$

represents a value of the impressions that are allocated to the booked orders; and storing, at least temporarily, a result of the determination.

12. The media of claim 11, wherein utilizing the one or more linear programs to determine whether characteristics of allocating the impressions are affected comprises:
   estimating an inventory of impressions that are available for accommodating the candidate order within the time segment;
   conditioned upon ostensibly accepting the candidate order, ascertaining whether the estimated inventory is nonuniformly delivered to such a degree that a variation-tolerance threshold is overcome; and
   when the variation-tolerance threshold is overcome, denying acceptance of the candidate order.

13. The media of claim 11, wherein utilizing the one or more linear programs to determine whether characteristics of allocating the impressions are affected comprises:
   estimating an inventory of impressions that are available for accommodating the candidate order within the time segment;
   conditioned upon ostensibly accepting the candidate order, ascertaining whether a predetermined quantity of high-value impressions within the estimated inventory are allocated to the booked orders; and
   when the predetermine quantity of the high-value impressions, or more, is allocated to the booked orders, denying acceptance of the candidate order.

14. The media of claim 11, wherein minimizing a second object function of a second linear program subject to at least one constraint comprises minimizing the second object function subject to a first constraint $$\forall_j \sum_{i \in L_j, t \in T_j} x_{ijt} = G_j - M_j$$

of the second linear program, wherein $M_j$ represents a predetermined number of the booked orders that are undelivered upon accepting the candidate order and $G_j$ represents the log of the booked orders scheduled to be placed at the leaf node within the time segment.

15. The media of claim 14, wherein minimizing a second object function of a second linear program subject to at least one constraint comprises minimizing the second object function subject to a second constraint $$\forall_{i,j,t} \; x_{ijt} \leq C_{it} S_{it}(j) p(U_j) - \sum_{k \neq j \; s.t. R_k \geq R_j} x_{ikt} \frac{S_{it}(j,k)}{S_{it}(k)} p\langle U_j | U_k \rangle$$

of the second linear program, wherein a first term $C_{it}S_{it}(j)p(U_j)$ represents the estimated inventory of impressions available that meet the placement criteria and a second term $$\sum_{k \neq j \; s.t. R_k \geq R_j} x_{ikt} \frac{S_{it}(j,k)}{S_{it}(k)} p\langle U_j | U_k \rangle$$

represents a portion of the estimated inventory of impressions that is ostensibly allocated to the booked orders submitted by customers that have a priority level which ranks higher or equal to a priority level assigned to an advertiser submitting the candidate order.

16. The media of claim 15, wherein minimizing a second object function of a second linear program subject to at least one constraint comprises minimizing the second object function subject to a third constraint $$\forall_{j,t} \left[\sum_{i \in L_j} x_{ijt} - F_{jt} G_j\right] \leq DF_{jt} G_j + \delta_{jt}$$

of the second linear program, wherein a first term $$\forall_{j,t} \left[\sum_{i \in L_j} x_{ijt} - F_{jt} G_j\right]$$

represents an accumulated difference between a uniform distribution and a scheduled allocation of the impressions over the time segment, $DF_{jt}G_j$ represents a variation-tolerance threshold, and $\delta_{jt}$ represents a distance of deviation from a prescribed range of uniformity.

17. A delivery engine for executing a first and second linear program that determines whether to accept a candidate order taking into account booked orders competing for inventory, the delivery engine comprising a processing unit coupled to a computer storage medium, the computer storage medium having stored thereon a plurality of computer software components executable by the processing unit that perform the method comprising:
   receiving the candidate order with associated placement criteria that identifies a quantity of impressions of at least one advertisement to place, a time segment over which the quantity of impressions are anticipated to be placed, and at which leaf node the impressions are expected to be rendered;
   estimating an inventory of impressions that are available for accommodating the candidate order within the time segment;
   identifying a log of booked orders scheduled to be placed within the time segment, wherein the identified booked orders compete to be placed at the leaf node;
   utilizing the first linear program to calculate a number of orders of the candidate order joined with the competing booked orders that are undeliverable by comparing the estimated inventory against the joined orders;
   utilizing the second linear program and the calculated number of undeliverable orders to calculate a portion of the estimated inventory that is nonuniformly delivered and a financial value of the estimated inventory allocated to the candidate order; and
   accepting the candidate order based on an evaluation of outputs calculated by the first and second linear programs.

* * * * *